United States Patent [19]

Brower, Jr.

[11] Patent Number: 5,365,795
[45] Date of Patent: Nov. 22, 1994

[54] IMPROVED METHOD FOR DETERMINING FLOW RATES IN VENTURIS, ORIFICES AND FLOW NOZZLES INVOLVING TOTAL PRESSURE AND STATIC PRESSURE MEASUREMENTS

[76] Inventor: William B. Brower, Jr., 47 Second St., Troy, N.Y. 12180

[21] Appl. No.: 64,967

[22] Filed: May 20, 1993

[51] Int. Cl.$^5$ .......................... G01F 1/44; G01F 1/46
[52] U.S. Cl. ............................... 73/861.65; 73/861.63
[58] Field of Search ........... 73/861.02, 861.03, 861.61, 73/861.63, 861.65, 861.66, 861.52

[56] References Cited

U.S. PATENT DOCUMENTS

| | | | |
|---|---|---|---|
| 1,698,314 | 1/1929 | Mapelsden | 73/861.61 |
| 3,600,945 | 8/1971 | Wenzel et al. | 73/861.52 |
| 3,805,612 | 4/1974 | Shiba | 73/211 |
| 3,822,592 | 7/1974 | Siegel et al. | 73/211 |
| 3,889,536 | 6/1975 | Sylvester | 73/861.65 |
| 3,918,305 | 11/1975 | Benedict | 3/211 |
| 3,998,097 | 12/1976 | Akashi et al. | 73/211 |
| 4,040,293 | 8/1977 | Wilson | 73/211 |
| 4,130,017 | 12/1978 | Benedict et al. | 73/211 |
| 4,168,725 | 9/1979 | Astakhov et al. | 138/44 |
| 4,361,050 | 12/1982 | Coussot et al. | 73/861.47 |
| 4,372,171 | 2/1983 | Brandt, Jr. | 73/861.66 |
| 4,393,722 | 7/1983 | Scott | 73/861.61 |
| 4,476,729 | 10/1984 | Stables et al. | 73/861.65 |
| 4,481,828 | 11/1984 | Cheng | 73/861.63 |
| 4,562,744 | 1/1986 | Hall et al. | 73/861.02 |
| 4,599,906 | 7/1986 | Freud et al. | 73/861.52 |
| 4,730,500 | 3/1988 | Hughes | 73/861.52 |
| 4,753,114 | 6/1988 | Jones, Jr. et al. | 73/861.61 |

OTHER PUBLICATIONS

Eugene A. Avallone and Theodore Baumeister III, Editors, *Marks' Standard Handbook For Mechanical Engineers*, 3-62 to 3-66 (9th ed. 1987).

Primary Examiner—Richard E. Chilcot, Jr.
Assistant Examiner—William L. Oen
Attorney, Agent, or Firm—Buchanan Ingersoll; Robert J. Pugh

[57] ABSTRACT

The present invention provides a method and device for ascertaining flow rate of a fluid based on measured values of the upstream fluid total-pressure and static-pressure measured downstream the entrance of a flow constricting member, such as an orifice plate, a flow nozzle or a venturi. According to principles set forth herein, this parameter allows simplification of flow rate determinations for both compressible and incompressible fluids. As a result, significant computational advantages may be achieved in comparison with the prior art. In presently preferred embodiments, a first pressure sensor means for detecting the upstream total fluid pressure includes a pitot-tube fluid-pressure sensor. In order to determine fluid density, a temperature probe may be provided to detect total temperature at the stagnation point created by the pitot tube. A second pressure sensor is also provided to detect the desired downstream static fluid pressure. A flowmeter constructed according to the invention further includes a suitable processor for receiving the measured information and determining flow rate based thereon.

20 Claims, 5 Drawing Sheets

IMPROVED METHOD FOR DETERMINING FLOW RATES IN VENTURIS, ORIFICES AND FLOW NOZZLES INVOLVING TOTAL PRESSURE AND STATIC PRESSURE MEASUREMENTS

BACKGROUND OF THE INVENTION

1. Field of the Invention

The present invention relates generally to the art of measuring the flow rate of a fluid traversing a conduit. More particularly, the invention relates to techniques for ascertaining flow rate based on selected pressure differentials measured within the conduit.

2. Description of the Prior Art

Various laboratory and industrial situations often require accurate measurement of fluid flow. Such fluid flow is frequently determined based on a pressure differential measured in a conduit through which the fluid is passing. Many flowmeters utilizing pressure differential principles are energy conversion devices in which flow rate is determined based on a static-pressure drop across a restriction in the flow path. Examples of this type of flowmeter include the orifice plate, flow nozzle and venturi meter.

With each of these meters, the fluid will experience an increase in velocity as it passes through the restriction. Due to energy conversion, the increasing kinetic energy of the fluid concomitant with the increase in velocity will be offset by a reduction in potential energy. This reduction in potential energy will be evidenced by a drop in fluid static-pressure. Knowing the static-pressure drop, as well the density of the fluid and the flow area of the restriction in the flow path, a theoretical value of the flow rate can be determined. To compensate for viscous effects and other factors which tend to make actual flow rate other than ideal, the theoretical flow rate is typically multiplied by an empirical "discharge coefficient" to obtain the actual flow rate.

A pitot-static tube makes a measurement at a single point in the flow from which the local velocity can be calculated. This local velocity is determined using a pitot tube and a static-pressure tap on the surface of an outer tube enclosing the pitot tube. The pitot tube, which is an open-ended tube facing the flow, feeds a pressure measuring device but does not let fluid flow through itself. The pitot tube therefore presents a barrier to the oncoming flow at which the flow comes to rest. The area at the open end of the pitot tube is thus referred to as a "stagnation point." With careful design, the stagnation point gives total-pressure, which in the case of incompressible flow is generally the sum of static-pressure and dynamic-pressure (i.e., pressure due to kinetic energy of the flow). In the case of compressible flow, however, the equations are more complicated and total-pressure cannot be thought of simply as the sum of static and dynamic pressure.

Because a pitot-static tube determines local velocity at a single point in the flow, it is not usually thought of as a flowmeter. However, by making measurements at a grid of points, in a plane normal to the flow direction, the flow rate can be determined by integrating over the points in the grid. This is called a "survey." Then, by calibrating the result (i.e., the flow rate) versus the velocity measurement at a designated point (e.g., the flow centerline) for a range of flow rates, the flow rate in can be determined in the future by making a measurement at that point only. In this sense, a pitot-static tube can become a "flowmeter." Use of a pitot-static tube as a flowmeter, however, is often undesirable because flow distortions which can occasionally be introduced upstream of the measurement location may cause significant errors in the measured flow rate.

SUMMARY OF THE INVENTION

The present invention provides a method and device for ascertaining flow rate of a fluid traversing a conduit based on a measurement of the fluid total-pressure upstream of a flow-constricting member located in the conduit and the static-pressure downstream of an entrance of the flow-constricting member. Examples of flow-constricting members which may be utilized with the invention include an orifice plate, a flow nozzle or a venturi. According to principles set forth herein, use of these values will allow simplification of flow rate determinations for both compressible and incompressible fluids. As a result, significant computational advantages may be achieved in comparison with the prior art.

In presently preferred embodiments, first pressure-sensing means for detecting the upstream fluid total-pressure includes a pitot-tube fluid-pressure sensor. In order to determine fluid density, temperature means may be provided to detect total temperature at or near the stagnation point created by the pitot tube. Second pressure-sensing means are provided to detect the desired downstream fluid static-pressure. A flowmeter constructed according to the invention further includes processing means for receiving the measured information and determining flow rate based thereon.

DETAILED DESCRIPTION

In accordance with the invention, the flow rate of a fluid traversing a conduit may be ascertained utilizing measured values of the upstream total-pressure and static-pressure downstream an entrance of a flow constricting member. As will be demonstrated, this technique provides significant computational efficiencies and other advantages when compared with the prior art. A particularly important advantage of the invention is the elimination of the need to employ a discharge coefficient depending on the ratio of flow area of the flow-constricting member to the flow area of the overall conduit. Furthermore, at least with respect to orifice plate and flow nozzle embodiments, flow rate can be determined based on a empirical flow coefficient which is substantially independent of Reynolds number effects. In the case of an orifice plate, this flow coefficient also provides a simple correlation from which flow rate increases beyond the critical regime can easily be determined. Additionally, at least with respect to orifice plate and flow nozzle embodiments, the flow rate of an incompressible fluid can be directly calculated without the use of correction factors as has been required in the past.

In order that advantages of the invention may be fully understood, certain theoretical aspects will be explained before describing the presently preferred embodiments. For purposes of definition, nomenclature in the following TABLE will be used consistently herein:

TABLE

NOMENCLATURE

Roman

| | |
|---|---|
| A | cross-sectional flow area |
| a | speed of sound in a fluid |
| C | discharge coefficient |
| D | diameter |
| M | Mach number |
| $\dot{m}$ | mass rate-of-flow |
| p | pressure |
| $\dot{Q}$ | volume rate-of-flow |
| R | gas constant |
| u | flow speed |
| X | flow coefficeent |
| Y | expansion factor |

Greek

| | |
|---|---|
| $\gamma$ | ratio of specific heats |
| $\rho$ | density |

Superscripts

| | |
|---|---|
| o | denotes total (stagnation) conditions |
| * | denote sonic condition |

Subscripts

| | |
|---|---|
| c | denotes calibrated flow |
| t | denotes theoretical flow |
| 1,2,3,4 | denote flow stations in conduit |

In order to simplify explanation of theoretical aspects of the invention, as well to emphasize certain unique features of orifice flow embodiments, much of the explanation herein will be directed to the problem of orifice flow. The relevant principles, however, are generally applicable to embodiments utilizing a flow nozzle and venturi with only minor modification. Where important differences between embodiments exist, these differences will be noted and described.

1. General Overview of Orifice Flow

Figure 1:
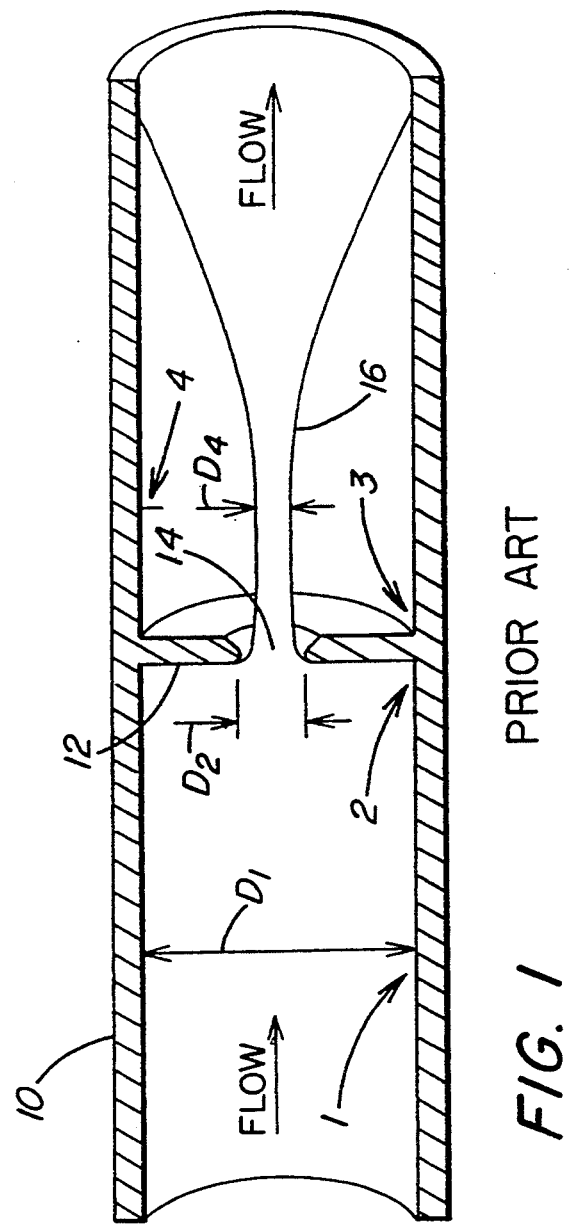
FIG. 1 is a longitudinal cross section of a fluid conducting conduit having therein an orifice plate inducing the formation of a fluid jet as diagrammatically illustrated.

Referring to FIG. 1, a conduit 10 is illustrated having a longitudinal flow path being traversed by a fluid as shown by the arrows. An orifice plate 12, defining a circular orifice 14, is located within conduit 10. Orifice 14, which has a diameter $D_2$ smaller than the inner diameter $D_1$ of conduit 10, functions as a fluid passage to induce a free jet 16 as shown. In incompressible or subcritical compressible flow, jet 16 contracts to a minimum area (having a diameter $D_4$) several orifice diameters downstream. This minimum area of jet 16 is referred to as the vena contracta. As the flow proceeds downstream, jet 16 gradually expands to again fill conduit 10. In supercritical compressible flow, as will be explained more fully below, the point of minimum area lies very close to the back side of orifice plate 12. Because of the complex flow profile in this case, the minimum area of jet 16 cannot be considered a vena contracta in the true sense.

In order to discuss the method in which flow rate of fluid through an orifice has generally been measured in the past and how the same is ascertained according to the present invention, flow locations 1, 2, 3 and 4 will be defined. Location 1 is upstream of orifice plate 12 a sufficient distance that flow can generally be regarded as one-dimensional. The term one-dimensional signifies that flow variables (e.g., pressure, temperature, velocity, etc.) in a cross-sectional slice of the flow at this location can be modeled by utilizing the actual value of the particular variable at this point as representative of the average value for all points in the slice. Locations 2 and 3 are adjacent the front face and back face of orifice plate 12, respectively. Location 4 is adjacent to the point of vena contracta.

Many experiments have demonstrated that the static-pressure $p_4$ at location 4 is approximately equal to the static-pressure $p_3$ measured at location 3. Thus, it is intended that these two quantities be taken as interchangeable herein. In the case of a flow nozzle, sensing location 3 is, strictly speaking, adjacent the flow nozzle exit. However, as with an orifice plate, the static pressure in the plenum fluid is generally invariant. Thus, the pressure $p_3$ may conveniently be measured anywhere within a range of locations along the conduit inner surface behind the back face of the plate or nozzle. In the case of a venturi, locations 2 and 3 can be taken as the same location, i.e., inside the venturi throat.

It has been demonstrated that, at flow velocities through orifice 14 less than the speed of sound in the fluid at that station (i.e., subcritical flow), the velocity profile at the point of vena contracta will be essentially one-dimensional. While the cross sectional area $A_4$ of jet 16 at location 4 can be estimated, it has generally been taken as theoretically unknown for both compressible and incompressible fluids. In current practice, this requires the introduction of a discharge coefficient C which accounts for downstream contraction and viscous effects. The discharge coefficient C is usually plotted (after calibration) as a series of curves versus the upstream Reynolds number at location 1. The respective curves correspond to particular orifice-to-conduit area ratios $A_2/A_1$ or, more simply, $A_{21}$. The discharge coefficient C is often referred to as a "flow coefficient." This "flow coefficient," however, is not to be confused with the flow coefficient X of the present invention which will be discussed and defined below.

Assuming orifice plate 12 is machined to standard specifications, the flow rate can be calculated based on the measurement of the static-pressure drop $\Delta p \equiv p_2 - p_3$ and the discharge coefficient C. The semiempirical relations for incompressible and compressible flow through the orifice 12 may be expressed as follows:

$$\dot{m} = CA_2 (2\rho_1 \Delta p)^{\frac{1}{2}} \quad \text{(incompressible)}$$

$$\dot{m} = CYA_2 (2\rho_1 \Delta p)^{\frac{1}{2}} \quad \text{(compressible)}$$

where $\rho_1$ is the density of the fluid at location 1. Note that the two equations differ only by the factor Y in the case of a compressible fluid. The factor Y is referred to as the "expansion factor" and accounts for variations in fluid properties, particularly density, as the fluid undergoes changes in pressure. The expansion factor Y is generally plotted versus static-pressure ratio ($p_3/p_2$)

with diameter ratio ($D_2/D_1$) as parameter. Because the Reynolds number is not known in advance, an iterative calculation must be performed to obtain the discharge coefficient C. Additionally, unlike the present invention, these techniques are limited to subcritical flow situations.

2. Theory of the Invention

A significant aspect of the present invention is the introduction of a theoretical model of subcritical compressible flow from location 1 to location 4. This model is based in part on the relationship between upstream total-pressure $p°_1 \equiv p°$ and downstream static-pressure $p_4$ instead of the usual static-pressure drop $\Delta p$. This choice leads to substantial simplification in the case of both incompressible and compressible flow.

At location 2, the flow is clearly not one dimensional. At location 4, however, flow is presumed (in subcritical flow) to become almost uniform. Upstream at location 1, the flow is also treated as uniform. Imposing the restrictions of steady, isoenergetic, inviscid (therefore isentropic) and perfect-gas flow, total conditions T°, p°, $\rho°$ as well as m can be thought of as constant throughout. The mass rate-of-flow in this situation is given by:

$$\dot{m} = \rho_4 u_4 A_4 = \frac{\rho_4}{\rho°} \cdot \frac{u_4}{a_4} \cdot \frac{a_4}{a°} \, \rho° a° A_4 \tag{1}$$

The isentropic condition yields:

$$\frac{\rho_4}{\rho°} = \left(\frac{p_4}{p°}\right)^{1/\gamma} = \left(\frac{a_4}{a°}\right)^{2/(\gamma-1)} \tag{2}$$

As a result:

$$\frac{a_4}{a°} = \left(\frac{p_4}{p°}\right)^{(\gamma-1)/2\gamma} \tag{3}$$

$$\rho_4 a_4/\rho° a° = \left(\frac{p_4}{p°}\right)^{(\gamma+1)/2\gamma} \tag{4}$$

From the compressible-flow energy equation:

$$(a°)^2 = a_4^2 + \frac{\gamma-1}{2} u_4^2 \tag{5}$$

By combining equation (5) with equation (2) ($p_4/p_o$ as independent variable) yields:

$$\frac{u_4}{a_4} = \left(\frac{2}{\gamma-1}\left(\left(\frac{p°}{p_4}\right)^{(\gamma-1)/\gamma} - 1\right)\right)^{\frac{1}{2}} \tag{6}$$

Substituting equation (4) and equation (6) into equation (1) produces the following expression for the theoretical mass-flowrate:

$$\dot{m}_t = \left\{\frac{2}{\gamma-1}\left(\frac{p_4}{p°}\right)^{2/\gamma}\left(1 - \left(\frac{p_4}{p°}\right)^{\frac{\gamma-1}{\gamma}}\right)\right\}^{\frac{1}{2}} \rho° a° A_4 \tag{7}$$

To place equation (7) in a form more amenable to direct measurement, the equation of state for a perfect gas, $p° = \rho° RT°$, and the expression for total speed-of-sound, $a° = (\gamma RT°)^{1/2}$ may be introduced to give:

$$\rho° a° = p°(\gamma/RT°)^{\frac{1}{2}} \tag{8}$$

Substituting equation (8) into equation (7) yields:

$$\dot{m}_t = \left\{\frac{2}{\gamma-1}\left(\frac{p_4}{p°}\right)^{2/\gamma}\left(1 - \left(\frac{p_4}{p°}\right)^{\frac{\gamma-1}{\gamma}}\right)\right\}^{\frac{1}{2}} p°(\gamma/RT°)^{\frac{1}{2}} A_4 \tag{9}$$

It can thus be seen that equation (9) requires knowledge of the flow area $A_4$ of the jet at the point of vena contracta (location 4). As discussed above, while this area can be estimated, it has generally been taken as theoretically unknown. In other words, there is no known closed-form theoretical expression available for the contraction coefficient of the jet in axisymmetric, compressible flow. However, for the corresponding two-dimensional case, the following exact result has been obtained:

$$\frac{A_4}{A_2} = \frac{\pi}{\pi + 2\, p_4/p°} \tag{10}$$

Equation (10), referred to as Busemann's relation, is strictly valid only in the limit of an infinite upstream plenum, i.e., for the case when $A_2/A_1 \to 0$. It is further restricted to jet flow speeds not greater than the speed of sound in the fluid.

Despite these limitations, it has been found that Busemann's relation, for the present invention, can be utilized with sufficient accuracy in the case of axisymmetric flow. To help illustrate this suitability, consider the case of incompressible flow where $p_4/p° \to 1$, in which:

$$\lim_{p_4/p_o \to 1} \frac{A_4}{A_2} = \frac{\pi}{\pi+2} = 0.6110 \tag{11}$$

For the axisymmetric case, as cited in the literature, the following result for the contraction coefficient, which is strictly valid for incompressible flow only, has been obtained using the method of steepest descent in a computerized numerical solution:

$$\frac{A_4}{A_2} = 0.59135 \pm 0.00004 \tag{12}$$

Thus, the axisymmetric value for incompressible flow (0.59135) is only about three per cent less than the two-dimensional value (0.6110). Therefore, by extension, Busemann's relation can be applied to the axisymmetric compressible flow with, at worst, only minor resulting errors. Thus, combining equations (9), (10), and (2) and replacing the pressure $p_4$ with the more easily measured pressure $p_3$ gives the following expression for the theoretical mass-flow-rate through an orifice (in subcritical flow):

$$\dot{m}_t = \left\{ \frac{2}{\gamma-1} \left(\frac{p_3}{p^o}\right)^{2/\gamma} \left[1 - \left(\frac{p_3}{p^o}\right)^{\frac{\gamma-1}{\gamma}}\right] \right\}^{\frac{1}{2}} \left(1 + \frac{2}{\pi}\left(\frac{p_3}{p^o}\right)^{1/\gamma}\right)^{-1} p^o (\gamma/RT^o)^{\frac{1}{2}} A_2 \quad (13)$$

This equation eliminates the need to measure area $A_4$ and is therefore capable of being directly solved. The corresponding mass-flow-rates for a flow nozzle or venturi would both be given by the following expression which does not involve a jet area calculation:

$$\dot{m}_t = \left\{ \frac{2}{\gamma-1} \left(\frac{p_3}{p^o}\right)^{2/\gamma} \left[1 - \left(\frac{p_3}{p^o}\right)^{\frac{\gamma-1}{\gamma}}\right] \right\}^{\frac{1}{2}} p^o (\gamma/RT^o)^{\frac{1}{2}} A_3 \quad (14)$$

The area $A_3$ is the flow area at the flow nozzle exit or within the venturi throat.

In the case of a flow nozzle or venturi, a maximum flow rate will be attained as the downstream pressure continues to decrease. The pressure at which this maximum first value occurs is the critical pressure, given by:

$$\left(\frac{p^*}{p^o}\right) = \lim_{M_4 \to 1}\left(\frac{p_4}{p^o}\right) = \left(\frac{2}{\gamma+1}\right)^{\gamma/(\gamma-1)} \quad (15)$$

where $p^*/p^o = 0.528$ for 7/5 (i.e., for air).

In the case of the orifice plate, however, the shape of a free jet, and thus the flow rate, will respond to pressures lower than $p^*$. As a result, the flow rate will continue to increase as the pressure decreases. When the pressure downstream is lower than critical, the location of the jet minimum area moves closer to location 3. In the neighborhood of location 3, the flow is extremely complex and apparently no rational way is currently available to represent it by one-dimensional theory. Thus, equation (13) is not directly applicable in supercritical flow. Nevertheless, experimental data have been obtained according to the invention which demonstrate that a useful correlation is available allowing the flow rate to be ascertained at pressures lower than $p^*$.

During experimental trials of the invention, carefully regulated flow was passed through precision orifice plates of various sizes. The upstream total-pressure $p^o$ and downstream static-pressure $p_3$ were then measured and used to calculate the theoretical mass flow rate $\dot{m}_t$ according to equation (13). The theoretical values thus obtained were compared with the values measured by upstream flow nozzles. The ratio of actual (or calibrated) mass-flow-rate to theoretical mass-flow-rate can be defined as follows in terms of a flow coefficient X:

$$X = \dot{m}_c / \dot{m}_t \quad (16)$$

The experiment was repeated for a plurality of flow rates and several different orifice-to-conduit area ratios $A_{21}$. The experimental results are plotted in FIG. 2A as a function of the pressure ratio $p_3/p^o$.

As can be seen, each set of points for a specified value of $A_{21}$ defines a unique curve. Most of the data points lie within a band of $\Delta X = \pm 0.04$ from an estimated mean line shown in FIG. 2B. The proximity of data points for each value of $A_{21}$ to the estimated mean line indicates relative independence of the flow coefficient X on the value of $A_{21}$. The flow coefficient X also seems to be largely independent of Reynolds number effects. The estimated mean line shown in FIG. 2B can therefore be thought of as a universal calibration curve.

The smooth rise in the flow coefficient X as the downstream static-pressure $p_3$ falls below the critical pressure $p^*$ indicates that this relationship can be advantageously used to determine the increased flow rates attendant to a supercritical condition in the orifice plate. Thus, the following rule for the application of equation (13) may be used: (1) for $1 > p_3/p^o \geq p^*/p^o$, the measured values of $p^o$ and $p_3$ may be inserted directly into equation (13) and the resulting value of $\dot{m}_t$ multiplied by the flow coefficient, X, to obtain $\dot{m}_c$; (2) for supercritical flow where $0 \leq p_3/p^o < p^*/p^o$, the calibrated flow rate, $\dot{m}_c$, may be computed by replacing the actual values $p_3/p^o$ in equation (13) by the value $p^*/p^o$ and multiplying by the flow coefficient X, which depends, however, by the actual value of $p_3/p^o$.

Figure 2A:
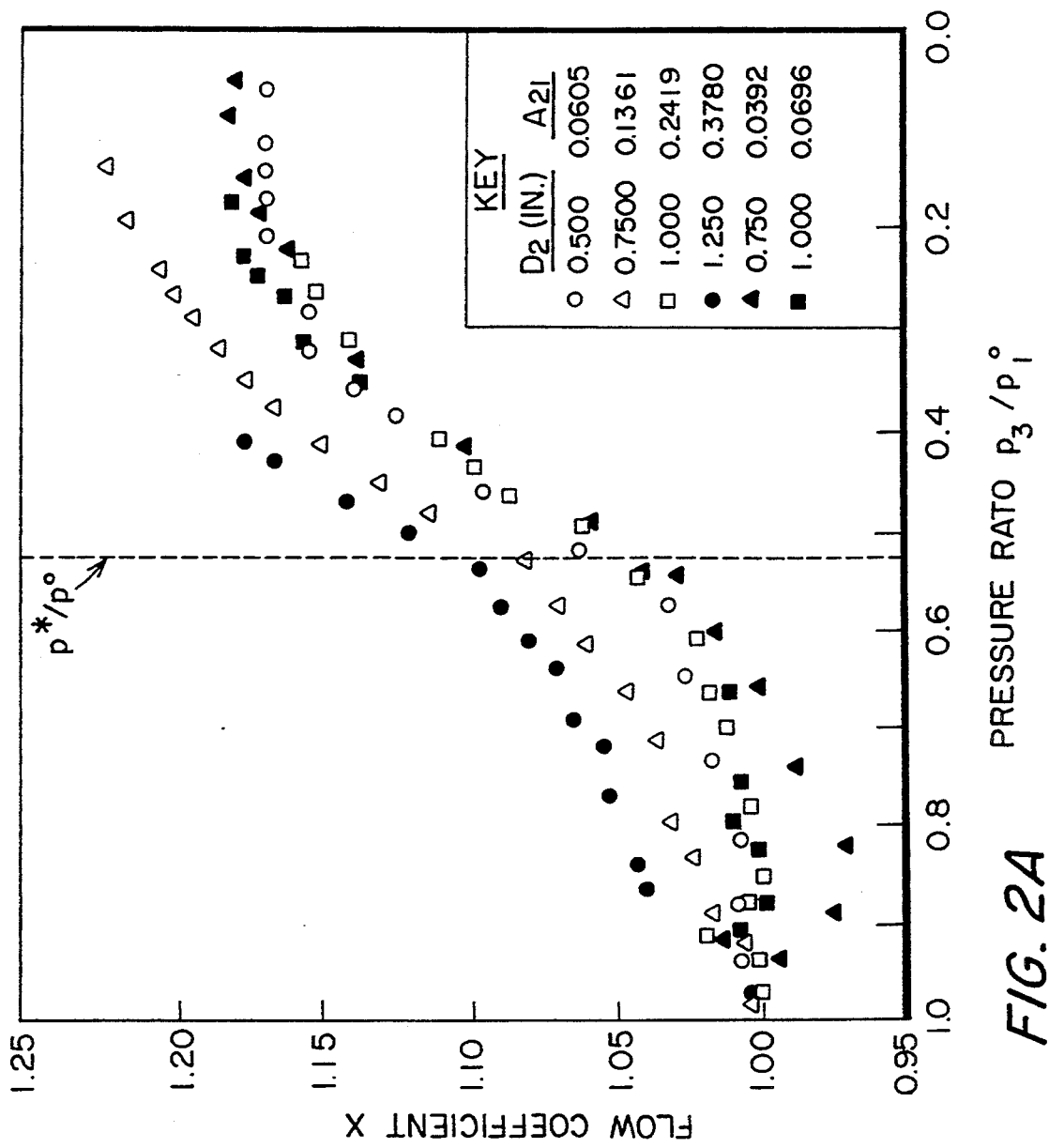
FIG. 2A is a graph of a flow coefficient, X, experimentally obtained for an orifice plate embodiment of the invention and plotted versus pressure ratio ($p_3p^\circ$) for various values of the orifice diameter and orifice/conduit area ratio.
Figure 2B:
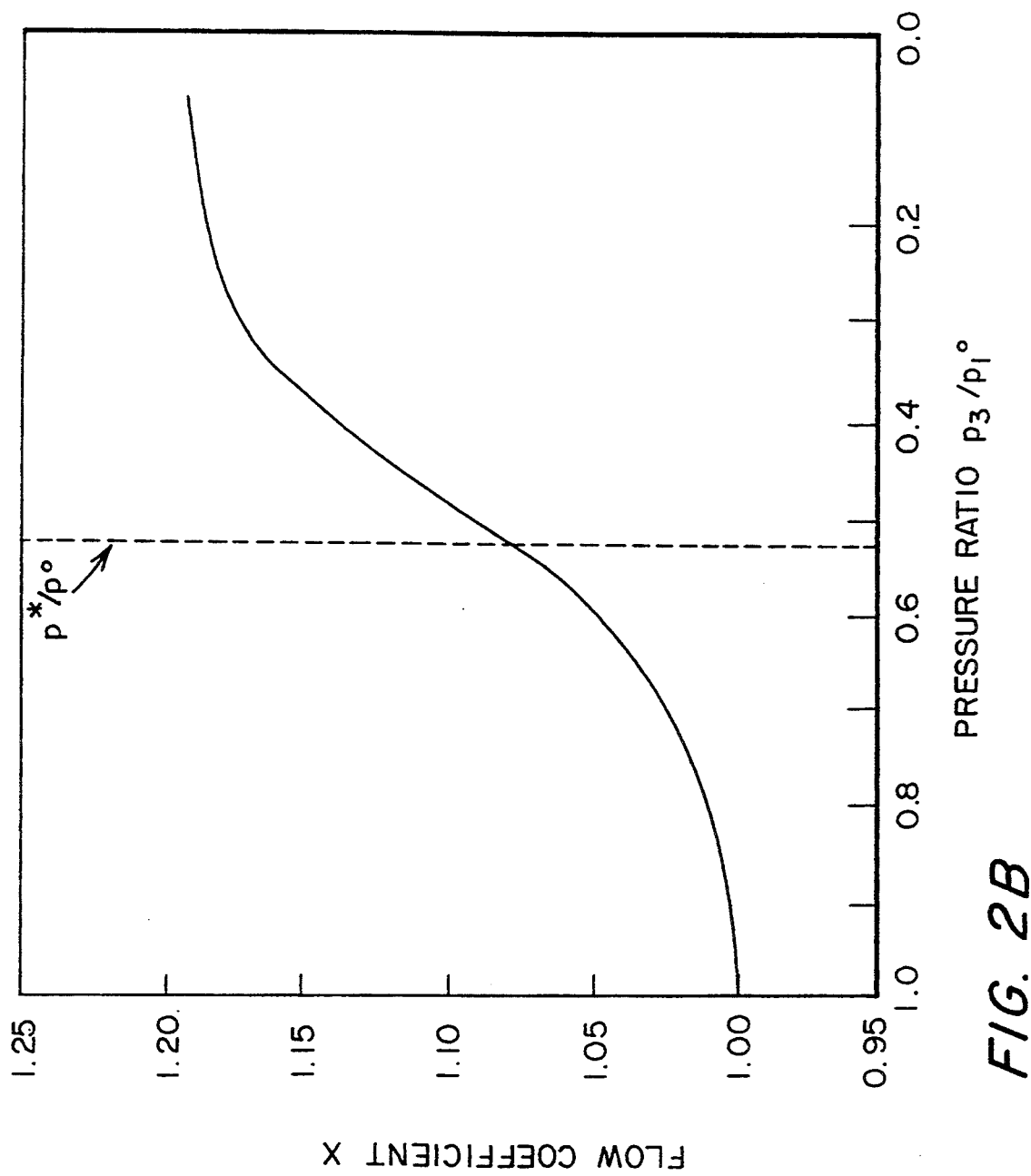
FIG. 2B is a graphical plot of an estimated mean line of the data shown in FIG. 2A.

The experimental results shown in FIGS. 2A and 2B evidence an additional benefit of the present invention. Specifically, it can be seen that the flow coefficient X approaches unity as $p_3/p^o \to 1$. In the case of a compressible fluid, the flow rate approaches zero as $p_3/p^o \to 1$. However, in the same limit, the density ratio $\rho_3/\rho^o$ also approaches unity (see equation (2)), meaning that the static density and total density are the same (i.e., incompressible flow). Thus, in the case of incompressible flow, the flow coefficient X can essentially be taken as unity. As a result, the theoretical relationships utilized to derive the flow rate of incompressible fluids can be significantly simplified from the prior art.

To derive expressions for the volumetric flow rate of an incompressible fluid according to the present invention, consider first the case of a flow-nozzle and a venturi. In this situation, the continuity equation and Bernoulli's equation, given below, are relevant:

Continuity equation $Q = Au = $ constant  (17)

Bernoulli's equation $p^o = p + \frac{1}{2}\rho u^2$  (18)

The first step in deriving the volumetric flow rate expression is to solve equation (18) for "u" in terms of the static-pressure at location 3. As discussed above, locations 2 and 3 are the same, i.e., within the throat section, in the case of a venturi. For a flow nozzle, the velocity at the flow nozzle exit is of interest but plenum static-pressure $p_3$ may be measured as convenient on the conduit inner surface. Solving equation (18) for "u" in terms of pressure $p_3$ thus gives:

$$u_3 = \left(\frac{2(p^o - p_3)}{\rho}\right)^{\frac{1}{2}} \quad (19)$$

Substituting equation (19) into equation (17) gives the following expression of volumetric flow rate in a flow nozzle or a venturi:

$$\dot{Q} = A_3 \left( \frac{2(p^o - p_3)}{\rho} \right)^{\frac{1}{2}} \qquad (20)$$

For an orifice plate, Bernoulli's equation between locations 1 and 4 may be written as follows:

$$\dot{Q} = A_4 \left( \frac{2(p^o - p_4)}{\rho} \right)^{\frac{1}{2}} \qquad (21)$$

The area $A_4$ in equation (21) may be eliminated using equation (11). Next, replacing $p_4$ by $p_3$ as discussed herein gives:

$$\dot{Q} = \left( \frac{\pi}{\pi + 2} \right) A_2 \left( \frac{2(p^o - p_3)}{\rho} \right)^{\frac{1}{2}} \qquad (22)$$

Due to the axisymmetric nature of the flow, equation (12) may then be used to give the following expression which is considered somewhat more precise than equation (22):

$$\dot{Q} = (0.59135) A_2 \left( \frac{2(p^o - p_3)}{\rho} \right)^{\frac{1}{2}} \qquad (23)$$

Equations (22) and (23) should be considered as generally equivalent for purposes of the invention. Additionally, the factor (0.59135) may be rounded to simplify calculation without departing from the teachings or scope of the disclosure herein.

Because, as explained above, the flow coefficient X approaches unity as the flow becomes incompressible, it is anticipated that the expressions above may be used in the case of incompressible flow to directly calculate flow rate for orifice plate and flow nozzle embodiments. In the case of a venturi, however, where the rapidly moving portion of the flow is bounded by a solid wall, Reynolds number effects are expected to have a greater impact. As a result, a series of calibration curves may be necessary which are dependent on Reynolds number, but not $A_{21}$ as in the prior art.

3. Description of Presently Preferred Embodiments

Based on the methodology described above, an effective flowmeter may be constructed to ascertain flow rate of both gases and liquids. As the equations developed herein amply demonstrate, only a few fluid-specific variables need be known in advance. While the flowmeter may, of course, be constructed for use with only one fluid, presently preferred embodiments utilize a look-up table or the like, embedded in a microprocessor, to store the fluid-specific information. In these embodiments, the look-up table address is specified by the user or other automated equipment in designating the fluid to be measured. For gases which deviate significantly from ideal, it may be most desirable to utilize a custom-designed processor to manipulate the more complex equations which can be expected.

Figure 3:
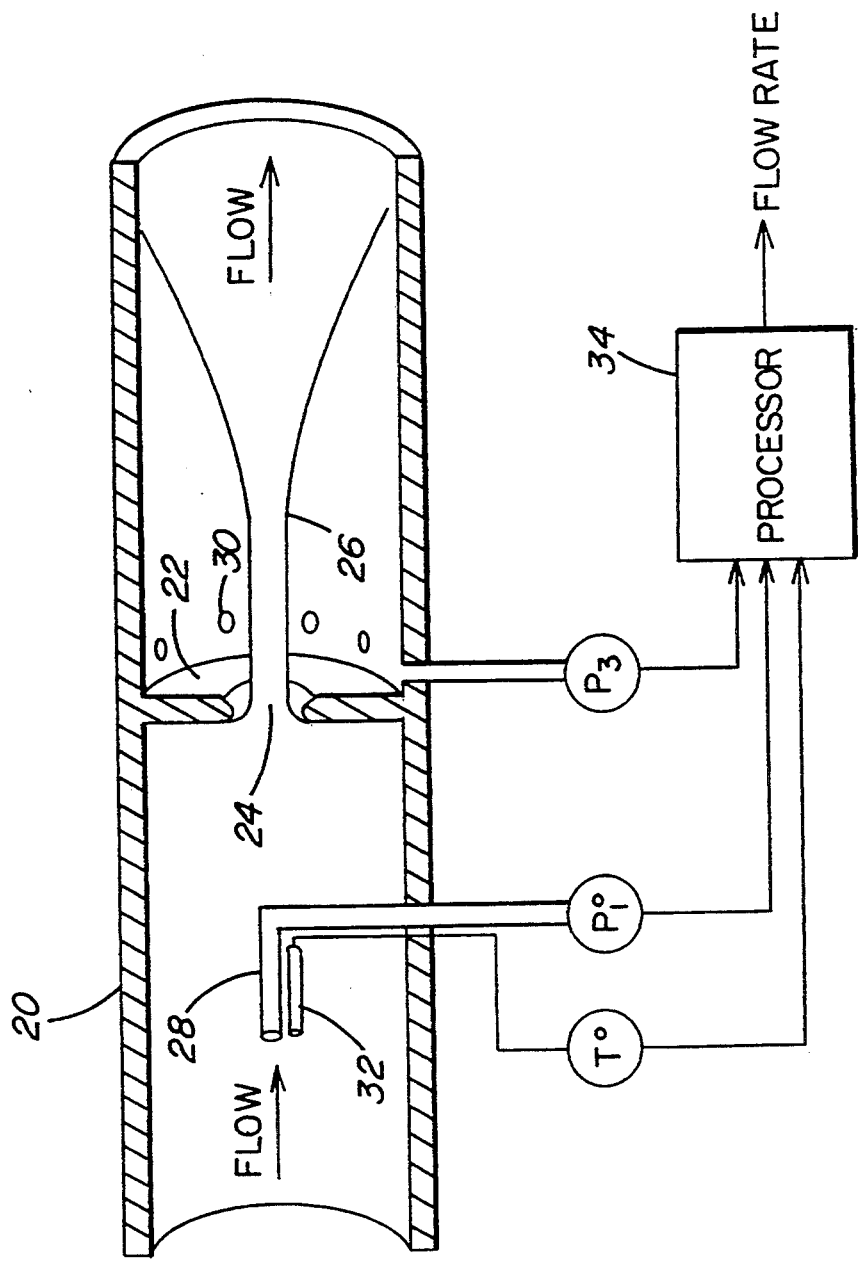
FIG. 3 is a view similar to FIG. 1 equipped to ascertain flow rate according with the teachings of the present invention.
Figure 4:
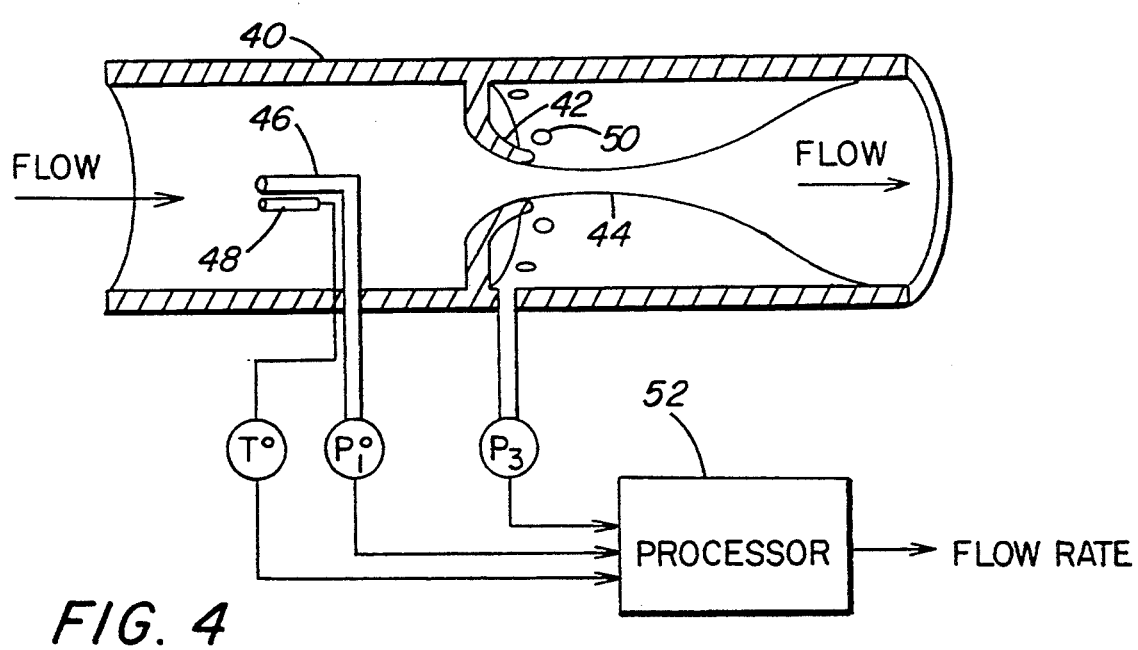
FIG. 4 is a longitudinal cross section of a fluid conducting conduit having therein a flow nozzle and further equipped to ascertain flow rate according to the teachings of the present invention.
Figure 5:
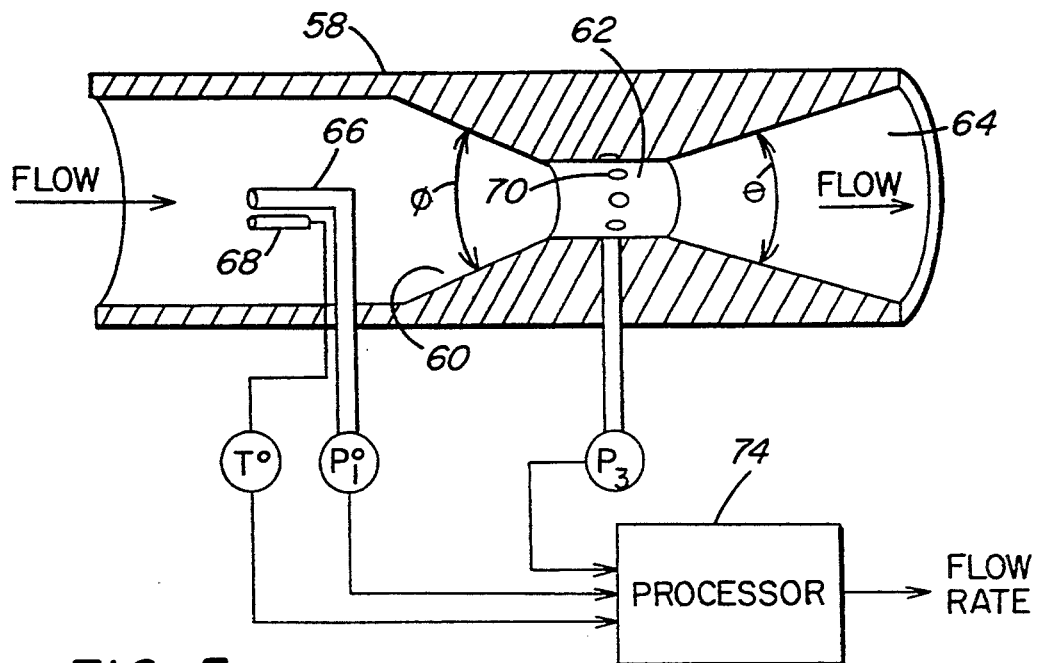
FIG. 5 is a longitudinal cross section of a fluid conduit having therein an integral venturi and further equipped to ascertain flow rate based on the teachings of the present invention.

FIGS. 3 through 5 illustrate presently preferred embodiments of a flowmeter device constructed in accordance with the invention respectively utilizing an orifice plate, a flow nozzle and a venturi. Each of these flow constricting members is preferably configured in accordance with standard specifications. VDI designs, specified in NACA TM'952, are believed to provide suitable configurations for orifice plate and flow nozzle embodiments. A typical geometry for a venturi is described on page 231 of the *ASME Research Report On Fluid Meters* (6th Ed. 1971).

Referring to FIG. 3, a conduit 20 is illustrated having therein an orifice plate 22. As in FIG. 1, flow of a fluid through orifice 24 induces a jet 26. The upstream total-pressure p° is preferably detected at location 1 by a pitot-tube fluid-pressure sensor 28 situated such that a stagnation point is created at the centerline of the flow. The averaged downstream static-pressure $p_3$ may be detected in this case by a series of static-pressure taps 30 located on the conduit inner surface adjacent the back face of orifice plate 22. A suitable temperature probe, such as temperature probe 32, may also be provided to measure total temperature T°. Depending on the degree of accuracy and other exigencies for the particular application, it may be desirable in some cases in which an incompressible fluid is measured to use a predetermined nominal value for fluid density. In these cases, temperature probe 32 may be eliminated. Generally, however, it is contemplated that temperature probe 32 would be included in most incompressible applications due to density variations caused by changes in temperature. The various density values at the respective temperatures so measured may be determined from a look-up tabulation or by any other suitable method. Additionally, although shown as separate instruments, the measurement of total temperature T° and total-pressure p° could both be combined in an integral instrument not much larger than the pitot tube itself.

Other factors which are used to ascertain flow rate, such as the flow area $A_2$ of orifice 24, would be predetermined. Based on this predetermined information and the measured data, processor 34 can calculate flow rate as described above. Typically, processor 34 may be a microprocessor appropriately programmed to calculate flow rate. In more difficult cases, however, a preprocessor may be utilized in communication with a mainframe computer, or a network. This may be particularly important if the application requires flow rate determinations on a real-time basis.

FIG. 4 illustrates a conduit 40 equipped with a flow nozzle 42 to create jet 44. The upstream total-pressure p° is sensed by pitot-tube fluid-pressure sensor 46. A temperature probe 48 may be provided to also detect total temperature T° at location 1. As with the orifice plate embodiment of FIG. 3, the downstream static-pressure $p_3$ is detected by a series of taps 50 along the inner wall of conduit 40 adjacent the downstream face of flow nozzle 42. Processor 52 receives total-pressure p°, static-pressure $p_3$ and, if necessary or desired, the total temperature T°. Based on this information, processor 52 produces output data representative of flow rate.

A presently preferred flowmeter device utilizing a venturi is illustrated in FIG. 5. Instead of the rather abrupt change in flow area as in orifice plate and flow nozzle embodiments, the venturi subjects the fluid to a more gradual constriction. This gradual change in flow area generally produces less flow losses (as measured by decreases in total pressure downstream of the meter) than the flow nozzle and orifice plate. Generally, the venturi includes a convergent cone section 60, a tubular "throat" section 62, and a divergent cone section 64. While possibly not evident from the diagrammatic representation of FIG. 5, divergent cone section 64 would generally have a significantly smaller interior angle $\theta$ than the interior angle $\phi$ of convergent cone section 60 in order to minimize exit losses.

As with other embodiments, upstream total-pressure p° is measured in a venturi embodiment utilizing a pitot-tube fluid-pressure sensor 66. Total temperature T° may be measured at the same point by temperature probe 68. Because no jet is generally created by a venturi, downstream static-pressure p3 is preferably measured in this case by static-pressure taps 70 within throat section 62. The measured information is received by processor 74, which produces a flow rate calculation as described above It can thus be seen that the invention provides a method and device for ascertaining flow rate of a fluid which has significant advantages over that provided by the prior art. While certain preferred embodiments and certain preferred methods of practicing the same have been shown and described, the invention is not limited thereto, but may be otherwise variously embodied and practiced within the scope of the following claims. It is to be particularly understood that rounding or other minor deviations of values in various equations may, where useful or feasible, occasionally be substituted for the more exact values derived completely herein and accordingly given below.

I claim:

1. A method of ascertaining a flow rate of fluid traversing a conduit, said conduit having an overall flow area, said method comprising the steps of:
   (a) passing said fluid through a flow constricting member in said conduit, said flow constricting member defining a fluid passage having a preselected flow area:
   (b) sensing a fluid total-pressure p° at a first pressure sensing location in said conduit upstream of said flow constricting member;
   (c) sensing a fluid static-pressure p3 at a second pressure sensing location downstream of an entrance of said flow constricting member; and
   (d) determining said flow rate based on detected values of said fluid total-pressure p° and said fluid static-pressure p3, independent of a ratio of said flow area of said flow constricting member to said overall conduit flow area.

2. The method of claim 1 further comprising the following prior to step (d):
   (e) measuring a total temperature T° of said fluid.

3. The method of claim 2 wherein said fluid is a gas.

4. A method of ascertaining a flow rate of gas traversing a conduit, said method comprising the steps of:
   (a) passing said gas through a flow constricting member in said conduit, said flow constricting member defining a fluid passage having a preselected flow area;
   (b) sensing a fluid total-pressure p° at a first pressure sensing location in said conduit upstream of said flow constricting member;
   (c) sensing a fluid static-pressure p3 at a second pressure sensing location downstream of an entrance of said flow constricting member;
   (d) measuring a total temperature T° of said gas; and,
   (e) determining said flow rate based on detected values of said fluid total-pressure p° and said fluid static-pressure;
   wherein said flow constricting member is chosen from a group consisting of a flow nozzle and a venturi member and said flow rate is generally determined in step (e) by deriving a theoretical mass-flow-rate $\dot{m}_t$ according to:

$$\dot{m}_t = \left( \frac{2}{\gamma - 1} \left( \frac{p_3}{p^o} \right)^{2/\gamma} \left( 1 - \left( \frac{p_3}{p^o} \right)^{\frac{\gamma-1}{\gamma}} \right) \right)^{\frac{1}{2}} p^o (\gamma/RT^o)^{\frac{1}{2}} A_3$$

where: $\gamma$ is a ratio of specific heats of said gas;
$A_3$ is said preselected flow area of said flow constricting member; and
R is a gas constant for said gas.

5. The method of claim 4 further comprising the steps of:
   (h) calculating an actual pressure ratio, p3/p°, of said fluid static-pressure to said fluid total-pressure;
   (i) identifying for said actual pressure ratio, p3/p°, a calibration coefficient X generally lying along a universal calibration curve; and
   (j) multiplying said theoretical mass-flow-rate $\dot{m}_t$ by said calibration coefficient X to obtain a calibrated mass-flow-rate $\dot{m}_c$.

6. The method of claim 4 further comprising the following steps:
   (h) calculating an actual pressure ratio, p3/p°, of said fluid static-pressure to said fluid total-pressure;
   (i) comparing said actual pressure ratio to a critical pressure ratio, p*/p° where p* is a critical pressure at said second pressure sensing location; and
   (j) if said actual pressure ratio, p3/p°, is less than said critical pressure ratio, p*/p°, substituting said critical pressure p* for said fluid static-pressure p3 in deriving said theoretical mass-flow-rate $\dot{m}_t$, otherwise utilizing said actual pressure ratio, p3/p°, to derive said theoretical mass-flow-rate, $\dot{m}_t$;
   (k) identifying for said actual pressure ratio, p3/p°, a calibration coefficient X generally lying along a universal calibration curve shown in FIG. 2B; and,
   (l) multiplying said theoretical mass-flow-rate $\dot{m}_t$ by said calibration coefficient X to obtain a calibrated mass-flow-rate $\dot{m}_c$.

7. The method of claim 1 wherein said fluid is a liquid.

8. The method of claim 7 wherein said flow constricting member is an orifice plate and said flow rate is generally obtained in step (d) as a volumetric flow rate according to the following relationship:

$$\dot{Q} = \left( \frac{\pi}{\pi + 2} \right) A_2 \left( \frac{2(p^o - p_3)}{\rho} \right)^{\frac{1}{2}}$$

where $\rho$ is a density of said liquid.

9. A method of ascertaining a flow rate of liquid traversing a conduit, said method comprising the steps of:
   (a) passing said liquid through a flow constricting member in said conduit, said flow constricting member defining a fluid passage having a preselected flow area;
   (b) sensing a fluid total-pressure p° at a first pressure sensing location in said conduit upstream of said flow constricting member;
   (c) sensing a fluid static-pressure p3 at a second pressure sensing location downstream of an entrance of said flow constricting member; and, (d) determining said flow rate based on detected values of said fluid total-pressure p° and said fluid static-pressure;

wherein said flow constricting member is chosen from a group consisting of a flow nozzle and a venturi member and said flow rate is obtained in step (d) as a volumetric flow rate according to the following relationship:

$$\dot{Q} = A_3 \left( \frac{2(p^o - p_3)}{\rho} \right)^{\frac{1}{2}}$$

where $\rho$ is a density of said liquid.

10. The method of claim 9 further comprising the following steps prior to step (d):

(e) measuring a total temperature T° of said fluid; and, (f) determining said density $\rho$ of said liquid based on said total temperature T°.

11. A flowmeter device for ascertaining a flow rate of a fluid, said flowmeter device comprising:

(a) a conduit defining a longitudinal flow path for transmission of said fluid therethrough, said conduit having an overall flow area;

(b) a flow constricting member located within said conduit, said flow constricting member defining a fluid passage having a preselected flow area;

(c) first pressure sensing means for detecting a fluid total-pressure at a first pressure sensing location upstream of said flow constricting member;

(d) second pressure sensing means for detecting a fluid static-pressure at a second pressure sensing location downstream of an entrance of said flow constricting member; and, (e) processing means for determining said flow rate based on said fluid total-pressure and said fluid static-pressure, independent of a ratio of said flow area of said flow constricting member to said overall conduit flow area.

12. The flowmeter device of claim 11 further comprising:

(f) temperature means for detecting a total temperature of said fluid; and, (g) said processing means further utilizing an output of said temperature means in determining said flow rate.

13. The flowmeter device of claim 11 wherein said first pressure sensing means comprises a pitot-tube fluid-pressure sensor having an open face directed into said longitudinal flow path of said fluid along a centerline axis of said conduit.

14. The flowmeter device of claim 13 wherein said second pressure sensing means comprises a series of spaced-apart static-pressure taps annularly arranged at said second pressure sensing location.

15. The flowmeter of claim 13 wherein said flow constricting member comprises an orifice plate and further wherein said second pressure sensing means is positioned to detect said fluid pressure at a location generally adjacent a back face of said orifice plate.

16. The flowmeter of claim 13 wherein said flow constricting member comprises a flow nozzle and further wherein said second pressure sensing means is positioned to detect said static fluid pressure at a location generally adjacent to a back face of said flow nozzle.

17. The flowmeter of claim 13 wherein said flow constricting member comprises a venturi and further wherein said second pressure sensing means is positioned to detect said static fluid pressure at a location within a throat of said venturi.

18. A method of ascertaining a flow rate of a gas traversing a conduit, said method comprising the steps of:

(a) passing said gas through a flow constricting member in said conduit, said flow constricting member defining a fluid passage having a preselected flow area;

(b) sensing a fluid total-pressure p° at a first pressure sensing location in said conduit upstream of said flow constricting member;

(c) sensing a fluid static-pressure $p_3$ at a second pressure sensing location downstream of an entrance of said flow constricting member;

(d) measuring a total temperature T° of said gas;

(e) determining said flow rate based on detected values of said fluid total-pressure p° and said fluid static-pressure $p_3$;

wherein said flow constricting member is an orifice plate and further comprising the following steps:

(h) calculating an actual pressure ratio, $p_3/p°$, of said fluid static-pressure to said fluid total-pressure;

(i) comparing said actual pressure ratio to a critical pressure ratio, $p^*/P°$ where $p^*$ is a critical pressure at said second pressure sensing location;

(j) if said actual pressure ratio, $p_3/p°$, is less than said critical pressure ratio, $p^*/p°$, substituting said critical pressure $p^*$ for said fluid static-pressure $p_3$ in deriving said theoretical mass-flow-rate $\dot{m}_t$;

(k) identifying for said actual pressure ratio, $p_3/p°$, a calibration coefficient X generally lying along a universal calibration curve shown in FIG. 2B; and (i) multiplying said theoretical mass-flow-rate $\dot{m}_t$ by said calibration coefficient X to obtain a calibrated mass-flow-rate $\dot{m}_c$.

19. A method of ascertaining a flow rate of liquid traversing a conduit, said method comprising the steps of:

(a) passing said liquid through a flow constricting member in said conduit, said flow constricting member defining a fluid passage having a preselected flow area;

(b) sensing a fluid total-pressure p° at a first pressure sensing location in said conduit upstream of said flow constricting member;

(c) sensing a fluid static-pressure $p_3$ at a second pressure sensing location downstream of an entrance of said flow constricting member;

(d) measuring a total temperature T° of said liquid; and, (e) determining said density $\rho$ of said liquid based on said total temperature T°; and, (f) determining said flow rate based on detected values of said fluid total-pressure p° and said fluid static-pressure $p_3$, wherein said flow constricting member is an orifice plate and said flow rate is generally obtained in step (f) as a volumetric flow rate according to the following relationship:

$$\dot{Q} = \left( \frac{\pi}{\pi + 2} \right) A_2 \left( \frac{2(p^o - p_3)}{\rho} \right)^{\frac{1}{2}}$$

where $\rho$ is a density of said liquid.

20. A method of ascertaining a flow rate of a gas traversing a conduit, said method comprising the steps of:
   (a) passing said gas through a flow constricting member in said conduit, said flow constricting member defining a fluid passage having a preselected flow area;
   (b) sensing a fluid total-pressure p° at a first pressure sensing location in said conduit upstream of said flow constricting member;
   (c) sensing a fluid static-pressure p3 at a second pressure sensing location downstream of an entrance of said flow constricting member;
   (d) measuring a total temperature T° of said gas;
   (e) determining said flow rate based on detected values of said fluid total-pressure p° and said fluid static-pressure p3,
   wherein said flow constricting member is an orifice plate and said flow rate is generally determined in step (e) by deriving a theoretical mass-flow-rate, $\dot{m}_t$, according to:

$$\dot{m}_t = \left( \frac{2}{\gamma - 1} \left( \frac{p_3}{p^o} \right)^{2/\gamma} \left( 1 - \left( \frac{p_3}{p^o} \right)^{\frac{\gamma-1}{\gamma}} \right) \right)^{\frac{1}{2}} \left( 1 + \frac{2}{\pi} \left( \frac{p_3}{p^o} \right)^{1/\gamma} \right)^{-1} p^o \, (\gamma/RT^o)^{\frac{1}{2}} A_2$$

where: $\gamma$ is a ratio of specific heats of said gas; $A_2$ is said preselected flow area of said orifice plate; and R is a gas constant for said gas.

* * * * *